US012651322B2

(12) United States Patent (10) Patent No.: US 12,651,322 B2
Pu et al. (45) Date of Patent: Jun. 9, 2026

(54) CONTOUR EXTRACTION METHOD FROM INSPECTION IMAGE IN MULTIPLE CHARGED-PARTICLE BEAM INSPECTION

(71) Applicant: ASML Netherlands B.V., Veldhoven (NL)

(72) Inventors: Lingling Pu, San Jose, CA (US); Wei Fang, Milpitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 461 days.

(21) Appl. No.: 17/799,576

(22) PCT Filed: Jan. 27, 2021

(86) PCT No.: PCT/EP2021/051897
§ 371 (c)(1),
(2) Date: Aug. 12, 2022

(87) PCT Pub. No.: WO2021/160436
PCT Pub. Date: Aug. 19, 2021

(65) Prior Publication Data
US 2023/0117237 A1 Apr. 20, 2023

Related U.S. Application Data

(60) Provisional application No. 62/976,216, filed on Feb. 13, 2020.

(51) Int. Cl.
*G06T 5/77* (2024.01)
*G06T 5/50* (2006.01)
(Continued)

(52) U.S. Cl.
CPC .................. *G06T 5/77* (2024.01); *G06T 5/50* (2013.01); *G06T 7/001* (2013.01); *G06V 10/26* (2022.01);
(Continued)

(58) Field of Classification Search
CPC . G06T 2207/30148; G06T 2207/10061; G06T 2207/20081; G06T 2207/20084;
(Continued)

(56) References Cited

U.S. PATENT DOCUMENTS 7,626,691 B2 * 12/2009 Do ...................... G03F 7/70633
356/394
10,354,376 B2 * 7/2019 Weinberg ................ G06T 7/143
(Continued)

FOREIGN PATENT DOCUMENTS

CN 107924119 A 4/2018
CN 106574832 B 11/2018
(Continued)

OTHER PUBLICATIONS

International Search Report and Written Opinion received from the International Search Authority issued in related International Application No. PCT/EP2021/051897 mailed Mar. 22, 2021 (2 pgs.).
(Continued)

*Primary Examiner* — Sumati Lefkowitz
*Assistant Examiner* — Connor L Hansen
(74) *Attorney, Agent, or Firm* — FINNEGAN, HENDERSON, FARABOW, GARRETT & DUNNER, LLP

(57) ABSTRACT

An improved apparatus and method for extracting pattern contour information from an inspection image in a multiple charged-particle beam inspection system are disclosed. An improved method for extracting pattern contour information from an inspection image comprises identifying, from an inspection image obtained from a charged-particle beam inspection system, a first pattern and a second pattern that partially overlap in the inspection image. The method also comprises generating a first separation image by removing an image area corresponding to the second pattern from the
(Continued)

inspection image. The first separation image includes the first pattern of which a first part is removed when removing the image area corresponding to the second pattern. The method also comprises updating the first separation image to include image data representing the removed first part of the first pattern based on a first reference image corresponding to the first pattern.

15 Claims, 10 Drawing Sheets

(51) Int. Cl.
*G06T 7/00* (2017.01)
*G06V 10/26* (2022.01)
*G06V 10/44* (2022.01)

(52) U.S. Cl.
CPC .... *G06V 10/44* (2022.01); *G06T 2207/10061* (2013.01); *G06T 2207/30148* (2013.01)

(58) Field of Classification Search
CPC .. G06T 5/60; G06T 5/50; G06T 7/001; G06T 5/77; G06T 2207/20221; G06T 3/14; G06T 7/10; G06N 3/08; G06V 10/26; G06V 10/44; G06V 10/22; G06V 20/698; H01J 2237/2817
See application file for complete search history.

(56) References Cited

U.S. PATENT DOCUMENTS

| | | | | |
|---|---|---|---|---|
| 10,535,129 | B2 | 1/2020 | Kitazawa et al. | |
| 10,825,650 | B2 * | 11/2020 | Chou | H01J 37/153 |
| 2019/0164265 | A1 * | 5/2019 | Liao | G06T 7/001 |
| 2019/0378012 | A1 * | 12/2019 | Tripodi | G03F 7/70616 |
| 2020/0020092 | A1 | 1/2020 | Fang et al. | |

FOREIGN PATENT DOCUMENTS

| | | |
|---|---|---|
| CN | 110494894 A | 11/2019 |
| TW | 201920901 A | 6/2019 |
| TW | 201939564 A | 10/2019 |
| TW | 201940983 A | 10/2019 |

OTHER PUBLICATIONS

Jian Sun, Lu Yuan, Jiaya Jia, and Heung-Yeung Shum; "Image Completion with Structure Propagation," ACM Transactions on Graphics vol. 24, Issue 3 (https: //dl.acm.org/doi/10.1145/1073204. 1073274) Jul. 2005 (8 pgs.).
Office Action issued by the Intellectual Property Office (IPO), ROC (Taiwan) Patent Application No. 110104637, issued on Mar. 9, 2022 (19 pgs.).

* cited by examiner

100

300

B

A

400

460

CONTOUR EXTRACTION METHOD FROM INSPECTION IMAGE IN MULTIPLE CHARGED-PARTICLE BEAM INSPECTION

CROSS-REFERENCE TO RELATED APPLICATIONS

This application claims priority to International Application No. PCT/EP2021/051897, filed Jan. 27, 2021, and published as WO 2021/160436 A1, which claims priority of U.S. application Ser. No. 62/976,216 which was filed on Feb. 13, 2020. The contents of these applications are incorporated herein by reference in their entireties.

TECHNICAL FIELD

The embodiments provided herein relate to a contour extraction technology, and more particularly to contour extraction of patterns from an inspection image in a multiple charged-particle beam inspection.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, accuracy and yield in defect detection become more important.

Critical dimensions of patterns/structures measured from SEM image can be used to detect defects of manufactured ICs. For example, shifts between patterns or edge placement variations can be helpful in controlling manufacturing processes as well as in determining defects.

SUMMARY

The embodiments provided herein disclose a particle beam inspection apparatus, and more particularly, an inspection apparatus using a plurality of charged particle beams.

In some embodiments, a method for extracting pattern contour information from an inspection image comprises identifying, from an inspection image obtained from a charged-particle beam inspection system, a first pattern and a second pattern that partially overlap in the inspection image. The method also comprises generating a first separation image by removing an image area corresponding to the second pattern from the inspection image. The first separation image includes the first pattern of which a first part is removed when removing the image area corresponding to the second pattern. The method also comprises updating the first separation image to include image data representing the removed first part of the first pattern based on a first reference image corresponding to the first pattern.

In some embodiments, a contour extraction apparatus comprises a memory storing a set of instructions and at least one processor configured to execute the set of instructions to cause the apparatus to perform identifying, from an inspection image obtained from a charged-particle beam inspection system, a first pattern and a second pattern that partially overlap in the inspection image. The at least one processor is also configured to execute the set of instructions to cause the apparatus to further perform generating a first separation image by removing an image area corresponding to the second pattern from the inspection image. The first separation image includes the first pattern of which a first part is removed when removing the image area corresponding to the second pattern. The at least one processor is also configured to execute the set of instructions to cause the apparatus to further perform updating the first separation image to include image data representing the removed first part of the first pattern based on a first reference image corresponding to the first pattern.

In some embodiments, a non-transitory computer readable medium that stores a set of instructions that is executable by at least one processor of a computing device to cause the computing device to perform a method for extracting pattern contour information from an inspection image is provided. The method comprises identifying, from an inspection image obtained from a charged-particle beam inspection system, a first pattern and a second pattern that partially overlap in the inspection image. The method also comprises generating a first separation image by removing an image area corresponding to the second pattern from the inspection image. The first separation image includes the first pattern of which a first part is removed when removing the image area corresponding to the second pattern. The method further includes updating the first separation image to include image data representing the removed first part of the first pattern based on a first reference image corresponding to the first pattern.

In some embodiments, a method for measuring an overlay error from an inspection image comprises identifying, from an inspection image obtained from a charged-particle beam inspection system, a first pattern and a second pattern that partially overlap in the inspection image. The first pattern is in a buried layer. The method also comprises generating a first separation image including the first pattern and a second separation image including the second pattern from the inspection image. The method further comprises extracting contour information of the first pattern and the second pattern based on the first separation image and the second separation image. The method further comprises determining an overlay error between the first pattern and the second pattern based on the extracted contour information of the first pattern and the second pattern.

In some embodiments, a non-transitory computer readable medium that stores a set of instructions that is executable by at least one processor of a computing device to cause the computing device to perform a method for measuring an overlay error from an inspection image is provided. The method comprises identifying, from an inspection image obtained from a charged-particle beam inspection system, a first pattern and a second pattern that partially overlap in the inspection image, the first pattern being in a buried layer. The method also comprises generating a first separation image including the first pattern and a second separation image including the second pattern from the inspection image. The method also comprises extracting contour information of the first pattern and the second pattern based on the first separation image and the second separation image. The method further comprises determining an overlay error between the first pattern and the second pattern based on the extracted contour information of the first pattern and the second pattern.

Other advantages of the embodiments of the present disclosure will become apparent from the following description taken in conjunction with the accompanying drawings wherein are set forth, by way of illustration and example, certain embodiments of the present invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than $\frac{1}{1000}$th the size of a human hair.

Making these extremely small ICs is a complex, time-consuming, and expensive process, often involving hundreds of individual steps. Errors in even one step have the potential to result in defects in the finished IC rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). An SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

Critical dimensions of patterns/structures measured from SEM image can be used when identifying defects. For example, shifts between patterns or edge placement variations, which are determined from measured critical dimensions, can be used to identify defects of manufactured chips and to control manufacturing processes thereof. Such critical dimensions of patterns can be obtained from contour information of patterns on SEM image.

Figure 3:
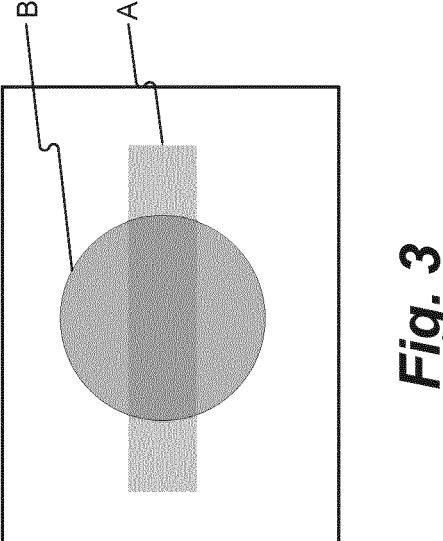
FIG. 3 is an example of an inspection image with a first pattern and a second pattern.

Overlaying patterns/structures is common in today's chip design (for example, as shown in FIG. 3). However, when taking an SEM image from overlaid patterns, signals from a pattern in a buried layer are usually not strong enough, which makes it challenging to extract reliable contour information of overlaid patterns from SEM image. To obtain reliable contour information of overlaid patterns from SEM images, embodiments of the present disclosure can provide techniques for restoring each pattern on the SEM image based on an inpainting algorithm. In the present disclosure, a restored image for each overlaid pattern can be obtained with aid of GDS files corresponding to the patterns in real time, such as by using machine learning. In the present disclosure, contour information of each overlaid pattern can be extracted from the restored image.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Figure 1:
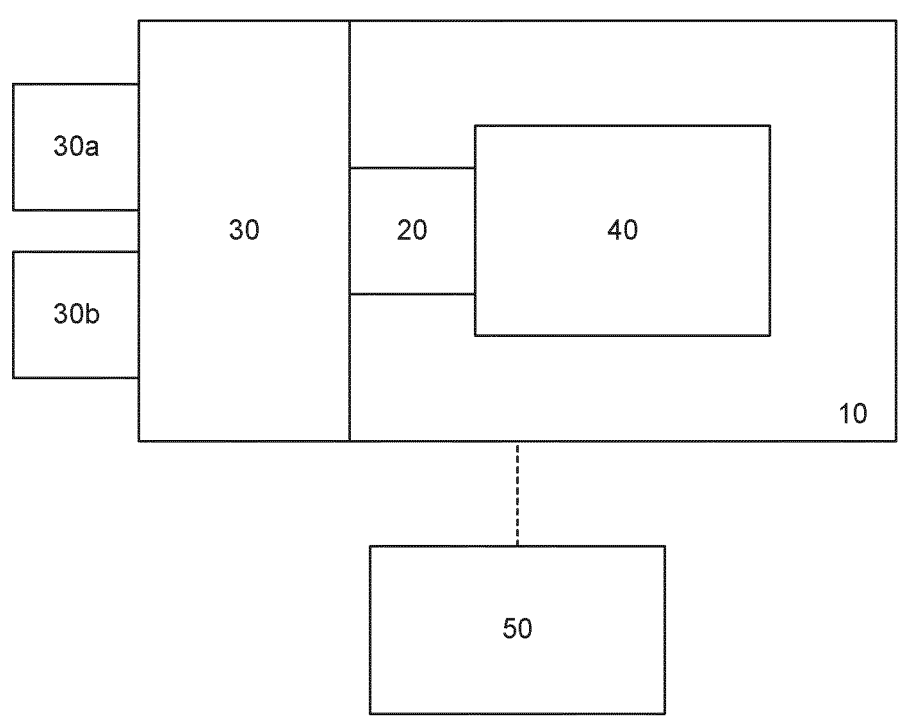
FIG. 1 is a schematic diagram illustrating an example electron beam inspection (EBI) system, consistent with embodiments of the present disclosure.

Reference is now made to FIG. 1, which illustrates an example electron beam inspection (EBI) system 100 consistent with embodiments of the present disclosure. As shown in FIG. 1, charged particle beam inspection system 100 includes a main chamber 10, a load-lock chamber 20, an electron beam tool 40, and an equipment front end module (EFEM) 30. Electron beam tool 40 is located within main chamber 10. While the description and drawings are directed to an electron beam, it is appreciated that the embodiments are not used to limit the present disclosure to specific charged particles.

EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below the atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by electron beam tool 40. In some embodiments, electron beam tool 40 may comprise a single-beam inspection tool. In other embodiments, electron beam tool 40 may comprise a multi-beam inspection tool.

Controller 50 may be electronically connected to electron beam tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an electron beam inspection system, it should be noted that aspects of the disclosure in their broadest sense, are not limited to a chamber housing an electron beam inspection system. Rather, it is appreciated that the foregoing principles may be applied to other chambers as well.

Figure 2:
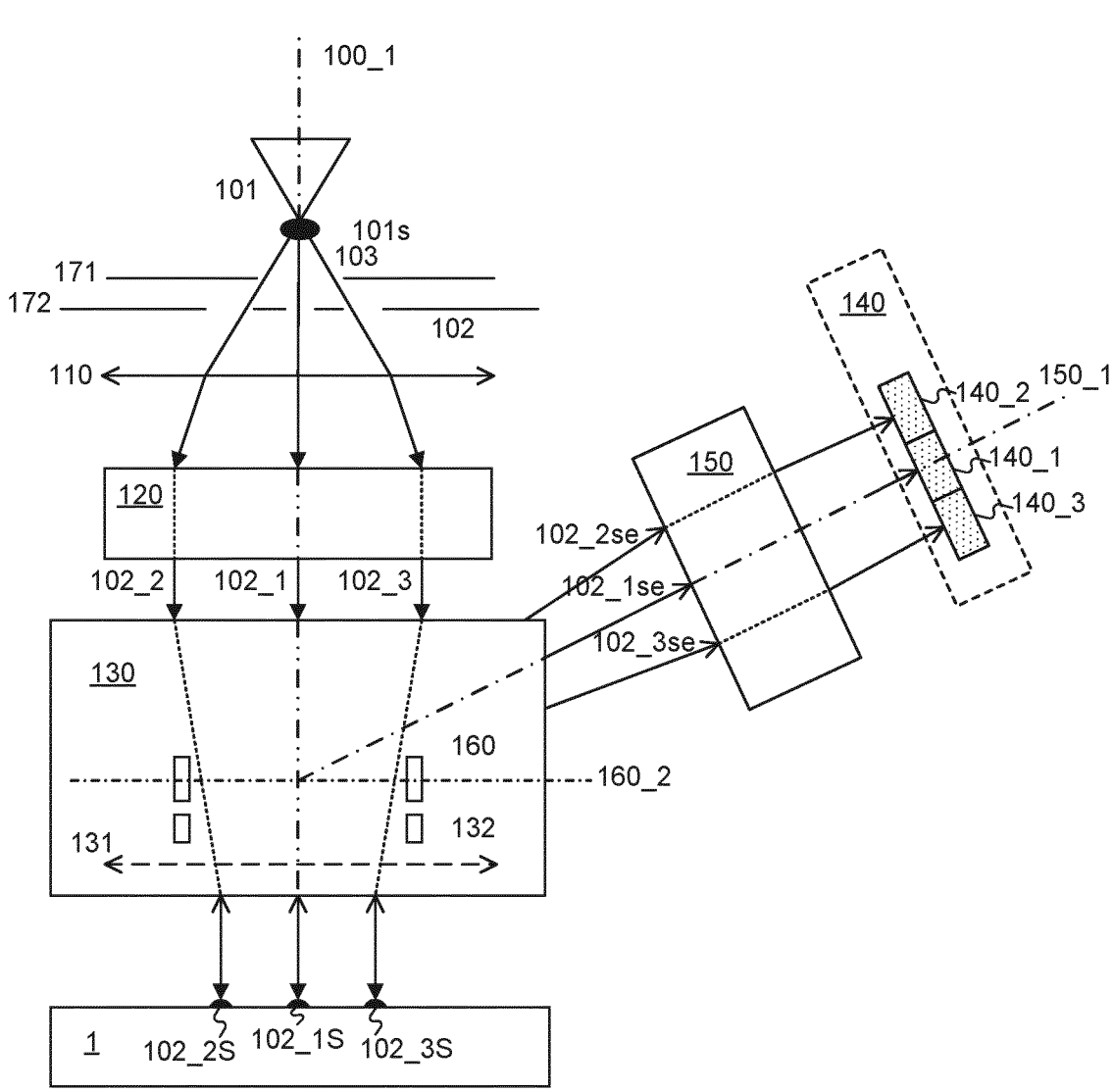
FIG. 2 is a schematic diagram illustrating an example electron beam tool that can be a part of the electron beam inspection system of FIG. 1, consistent with embodiments of the present disclosure.

Reference is now made to FIG. 2, which illustrates a schematic diagram illustrating an example electron beam tool 40 that can be a part of the example charged particle beam inspection system 100 of FIG. 1, consistent with embodiments of the present disclosure. An electron beam tool 40 (also referred to herein as apparatus 40) comprises an electron source 101, a gun aperture plate 171 with a gun aperture 103, a pre-beamlet forming mechanism 172, a condenser lens 110, a source conversion unit 120, a primary projection optical system 130, a sample stage (not shown in FIG. 2), a secondary imaging system 150, and an electron detection device 140. Primary projection optical system 130 can comprise an objective lens 131. Electron detection device 140 can comprise a plurality of detection elements 140_1, 140_2, and 140_3. Beam separator 160 and deflection scanning unit 132 can be placed inside primary projection optical system 130. It may be appreciated that other commonly known components of apparatus 40 may be added/omitted as appropriate.

Electron source 101, gun aperture plate 171, condenser lens 110, source conversion unit 120, beam separator 160, deflection scanning unit 132, and primary projection optical system 130 can be aligned with a primary optical axis 100_1 of apparatus 100. Secondary imaging system 150 and electron detection device 140 can be aligned with a secondary optical axis 150_1 of apparatus 40.

Electron source 101 can comprise a cathode, an extractor or an anode, wherein primary electrons can be emitted from the cathode and extracted or accelerated to form a primary electron beam 102 that forms a crossover (virtual or real) 101s. Primary electron beam 102 can be visualized as being emitted from crossover 101s.

Source conversion unit 120 may comprise an image-forming element array (not shown in FIG. 2), an aberration compensator array (not shown), a beam-limit aperture array (not shown), and a pre-bending micro-deflector array (not shown). The image-forming element array can comprise a plurality of micro-deflectors or micro-lenses to form a plurality of parallel images (virtual or real) of crossover 101s with a plurality of beamlets of primary electron beam 102. FIG. 2 shows three beamlets 102_1, 102_2, and 102_3 as an example, and it is appreciated that the source conversion unit 120 can handle any number of beamlets.

In some embodiments, source conversion unit 120 may be provided with beam-limit aperture array and image-forming element array (both are not shown). The beam-limit aperture array may comprise beam-limit apertures. It is appreciated that any number of apertures may be used, as appropriate. Beam-limit apertures may be configured to limit sizes of beamlets 102_1, 102_2, and 102_3 of primary-electron beam 102. The image-forming element array may comprise image-forming deflectors (not shown) configured to deflect beamlets 102_1, 102_2, and 102_3 by varying angles towards primary optical axis 100_1. In some embodiments, deflectors further away from primary optical axis 100_1 may deflect beamlets to a greater extent. Furthermore, image-forming element array may comprise multiple layers (not illustrated), and deflectors may be provided in separate layers. Deflectors may be configured to be individually controlled independent from one another. In some embodiments, a deflector may be controlled to adjust a pitch of probe spots (e.g., 102_1S, 102_2S, and 102_3S) formed on a surface of sample 1. As referred to herein, pitch of the probe spots may be defined as the distance between two immediately adjacent probe spots on the surface of sample 1.

A centrally located deflector of image-forming element array may be aligned with primary optical axis 100_1 of electron beam tool 40. Thus, in some embodiments, a central deflector may be configured to maintain the trajectory of beamlet 102_1 to be straight. In some embodiments, the central deflector may be omitted. However, in some embodiments, primary electron source 101 may not necessarily be aligned with the center of source conversion unit 120. Furthermore, it is appreciated that while FIG. 2 shows a side view of apparatus 40 where beamlet 102_1 is on primary optical axis 100_1, beamlet 102_1 may be off primary optical axis 100_1 when viewed from a different side. That is, in some embodiments, all of beamlets 102_1, 102_2, and 102_3 may be off-axis. An off-axis component may be offset relative to primary optical axis 100_1.

The deflection angles of the deflected beamlets may be set based on one or more criteria. In some embodiments, deflectors may deflect off-axis beamlets radially outward or away (not illustrated) from primary optical axis 100_1. In some embodiments, deflectors may be configured to deflect off-axis beamlets radially inward or towards primary optical axis 100_1. Deflection angles of the beamlets may be set so that beamlets 102_1, 102_2, and 102_3 land perpendicularly on sample 1. Off-axis aberrations of images due to lenses, such as objective lens 131, may be reduced by adjusting paths of the beamlets passing through the lenses. Therefore, deflection angles of off-axis beamlets 102_2 and 102_3 may be set so that probe spots 102_2S and 102_3S have small aberrations. Beamlets may be deflected so as to pass through or close to the front focal point of objective lens 131 to decrease aberrations of off-axis probe spots 102_2S and 102_3S. In some embodiments, deflectors may be set to make beamlets 102_1, 102_2, and 102_3 land perpendicularly on sample 1 while probe spots 102_1S, 102_2S, and 102_3S have small aberrations.

Condenser lens 110 is configured to focus primary electron beam 102. The electric currents of beamlets 102_1, 102_2, and 102_3 downstream of source conversion unit 120 can be varied by adjusting the focusing power of condenser lens 110 or by changing the radial sizes of the corresponding beam-limit apertures within the beam-limit aperture array. The electric currents may be changed by both, altering the radial sizes of beam-limit apertures and the focusing power of condenser lens 110. Condenser lens 110 may be an adjustable condenser lens that may be configured so that the position of its first principle plane is movable. The adjustable condenser lens may be configured to be magnetic, which may result in off-axis beamlets 102_2 and 102_3 illuminating source conversion unit 120 with rotation angles. The rotation angles may change with the focusing power or the position of the first principal plane of the adjustable condenser lens. Accordingly, condenser lens 110 may be an anti-rotation condenser lens that may be configured to keep the rotation angles unchanged while the focusing power of condenser lens 110 is changed. In some embodiments, condenser lens 110 may be an adjustable anti-rotation condenser lens, in which the rotation angles do not change when the focusing power and the position of the first principal plane of condenser lens 110 are varied.

Electron beam tool 40 may comprise pre-beamlet forming mechanism 172. In some embodiments, electron source 101 may be configured to emit primary electrons and form a primary electron beam 102. In some embodiments, gun aperture plate 171 may be configured to block off peripheral electrons of primary electron beam 102 to reduce the Coulomb effect. In some embodiments, pre-beamlet-forming mechanism 172 further cuts the peripheral electrons of primary electron beam 102 to further reduce the Coulomb effect. Primary-electron beam 102 may be trimmed into three primary electron beamlets 102_1, 102_2, and 102_3 (or any other number of beamlets) after passing through pre-beamlet forming mechanism 172. Electron source 101, gun aperture plate 171, pre-beamlet forming mechanism 172, and condenser lens 110 may be aligned with a primary optical axis 100_1 of electron beam tool 40.

Pre-beamlet forming mechanism 172 may comprise a Coulomb aperture array. A center aperture, also referred to herein as the on-axis aperture, of pre-beamlet-forming mechanism 172 and a central deflector of source conversion unit 120 may be aligned with primary optical axis 100_1 of electron beam tool 40. Pre-beamlet-forming mechanism 172 may be provided with a plurality of pre-trimming apertures (e.g., a Coulomb aperture array). In FIG. 2, the three beamlets 102_1, 102_2 and 102_3 are generated when primary electron beam 102 passes through the three pre-trimming apertures, and much of the remaining part of primary electron beam 102 is cut off. That is, pre-beamlet-forming mechanism 172 may trim much or most of the electrons from primary electron beam 102 that do not form the three beamlets 102_1, 102_2 and 102_3. Pre-beamlet-forming mechanism 172 may cut off electrons that will ultimately not be used to form probe spots 102_1S, 102_2S and 102_3S before primary electron beam 102 enters source conversion unit 120. In some embodiments, a gun aperture plate 171 may be provided close to electron source 101 to cut off electrons at an early stage, while pre-beamlet forming mechanism 172 may also be provided to further cut off electrons around a plurality of beamlets. Although FIG. 2 demonstrates three apertures of pre-beamlet forming mechanism 172, it is appreciated that there may be any number of apertures, as appropriate.

In some embodiments, pre-beamlet forming mechanism 172 may be placed below condenser lens 110. Placing pre-beamlet forming mechanism 172 closer to electron source 101 may more effectively reduce the Coulomb effect. In some embodiments, gun aperture plate 171 may be omitted when pre-beamlet forming mechanism 172 is able to be located sufficiently close to source 101 while still being manufacturable.

Objective lens 131 may be configured to focus beamlets 102_1, 102_2, and 102_3 onto a sample 1 for inspection and can form three probe spots 102_1s, 102_2s, and 102_3s on surface of sample 1. Gun aperture plate 171 can block off peripheral electrons of primary electron beam 102 not in use to reduce Coulomb interaction effects. Coulomb interaction effects can enlarge the size of each of probe spots 102_1s, 102_2s, and 102_3s, and therefore deteriorate inspection resolution.

Beam separator 160 may be a beam separator of Wien filter type comprising an electrostatic deflector generating an electrostatic dipole field E1 and a magnetic dipole field B1 (both of which are not shown in FIG. 2). If they are applied, the force exerted by electrostatic dipole field E1 on an electron of beamlets 102_1, 102_2, and 102_3 is equal in magnitude and opposite in direction to the force exerted on the electron by magnetic dipole field B1. Beamlets 102_1, 102_2, and 102_3 can therefore pass straight through beam separator 160 with zero deflection angles.

Deflection scanning unit 132 can deflect beamlets 102_1, 102_2, and 102_3 to scan probe spots 102_1s, 102_2s, and 102_3s over three small scanned areas in a section of the surface of sample 1. In response to incidence of beamlets 102_1, 102_2, and 102_3 at probe spots 102_1s, 102_2s, and 102_3s, three secondary electron beams 102_1se, 102_2se, and 102_3se may be emitted from sample 1. Each of secondary electron beams 102_1se, 102_2se, and 102_3se can comprise electrons with a distribution of energies including secondary electrons (energies<50 eV) and back-scattered electrons (energies between 50 eV and landing energies of beamlets 102_1, 102_2, and 102_3). Beam separator 160 can direct secondary electron beams 102_1se, 102_2se, and 102_3se towards secondary imaging system 150. Secondary imaging system 150 can focus secondary electron beams 102_1se, 102_2se, and 102_3se onto detection elements 140_1, 140_2, and 140_3 of electron detection device 140. Detection elements 140_1, 140_2, and 140_3 can detect corresponding secondary electron beams 102_1se, 102_2se, and 102_3se and generate corresponding signals used to construct images of the corresponding scanned areas of sample 1.

In FIG. 2, three secondary electron beams 102_1se, 102_2se, and 102_3se respectively generated by three probe spots 102_1S, 102_2S, and 102_35, travel upward towards electron source 101 along primary optical axis 100_1, pass through objective lens 131 and deflection scanning unit 132 in succession. The three secondary electron beams 102_1se, 102_2se and 102_3se are diverted by beam separator 160 (such as a Wien Filter) to enter secondary imaging system 150 along secondary optical axis 150_1 thereof. Secondary imaging system 150 focuses the three secondary electron beams 102_1se~102_3se onto electron detection device 140 which comprises three detection elements 140_1, 140_2, and 140_3. Therefore, electron detection device 140 can simultaneously generate the images of the three scanned regions scanned by the three probe spots 102_1S, 102_2S and 102_3S, respectively. In some embodiments, electron detection device 140 and secondary imaging system 150 form one detection unit (not shown). In some embodiments, the electron optics elements on the paths of secondary electron beams such as, but not limited to, objective lens 131, deflection scanning unit 132, beam separator 160, secondary imaging system 150 and electron detection device 140, may form one detection system.

In some embodiments, controller 50 may comprise an image processing system that includes an image acquirer (not shown) and a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detection device 140 of apparatus 40 through a medium such as an electrical conductor, optical fiber cable, portable storage media, IR, Bluetooth, internet, wireless network, wireless radio, among others, or a combination thereof. In some embodiments, the image acquirer may receive a signal from electron detection device 140 and may construct an image. The image acquirer may thus acquire images of sample 1. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, the image acquirer may acquire one or more images of a sample based on one or more imaging signals received from electron detection device 140. An imaging signal may correspond to a scanning operation for conducting charged particle imaging. An acquired image may be a single image comprising a plurality of imaging areas or may involve multiple images. The single image may be stored in the storage. The single image may be an original image that may be divided into a plurality of regions. Each of the regions may comprise one imaging area containing a feature of sample 1. The acquired images may comprise multiple images of a single imaging area of sample 1 sampled multiple times over a time sequence or may comprise multiple images of different imaging areas of sample 1. The multiple images may be stored in the storage. In some embodiments, controller 50 may be configured to perform image processing steps with the multiple images of the same location of sample 1.

In some embodiments, controller 50 may include measurement circuitries (e.g., analog-to-digital converters) to obtain a distribution of the detected secondary electrons. The electron distribution data collected during a detection time window, in combination with corresponding scan path data of each of primary beamlets 102_1, 102_2, and 102_3 incident on the wafer surface, can be used to reconstruct images of the wafer structures under inspection. The reconstructed images can be used to reveal various features of the internal or external structures of sample 1, and thereby can be used to reveal any defects that may exist in the wafer.

In some embodiments, controller 50 may control a motorized stage (not shown) to move sample 1 during inspection. In some embodiments, controller 50 may enable the motorized stage to move sample 1 in a direction continuously at a constant speed. In other embodiments, controller 50 may enable the motorized stage to change the speed of the movement of sample 1 over time depending on the steps of scanning process. In some embodiments, controller 50 may adjust a configuration of primary projection optical system 130 or secondary imaging system 150 based on images of secondary electron beams 102_1se, 102_2se, and 102_3se.

Although FIG. 2 shows that electron beam tool 40 uses three primary electron beams, it is appreciated that electron beam tool 40 may use two or more number of primary electron beams. The present disclosure does not limit the number of primary electron beams used in apparatus 40.

Reference is now made to FIG. 3, which is an example of an inspection image 300 with a first pattern A having a rectangular shape and a second pattern B having a circular shape. According to embodiments of the present disclosure, inspection image 300 can be obtained by a charged-particle beam inspection system (e.g., electron beam inspection system 100 of FIG. 1). For example, inspection image 300 can be an electron beam image generated based on an electron detection signal from electron detection element 140. It is illustrated in FIG. 3 that first pattern A and second pattern B are overlaid. For example, first pattern A in inspection image 300 may be generated based on electron detection signals coming from a first layer of structure of a sample and a second pattern B may be generated based on electron signals coming from a second layer of structure that is positioned on top of the first layer. In this example, first pattern A is in a buried layer. Accordingly, electron beam signals for first pattern A may be weaker than electron beam signals for second pattern B. It is also possible that a part of first pattern A that is covered by second pattern B may not be visible or distinguishable in inspection image 300. Even for second pattern B, an overlapping area with first pattern A may be indistinct due to various reasons, such as a different signal-to-noise ratio compared to a non-overlapping area. Therefore, it is challenging to extract contour information of patterns from inspection image when multiple patterns are overlaid in inspection image.

Figure 4:
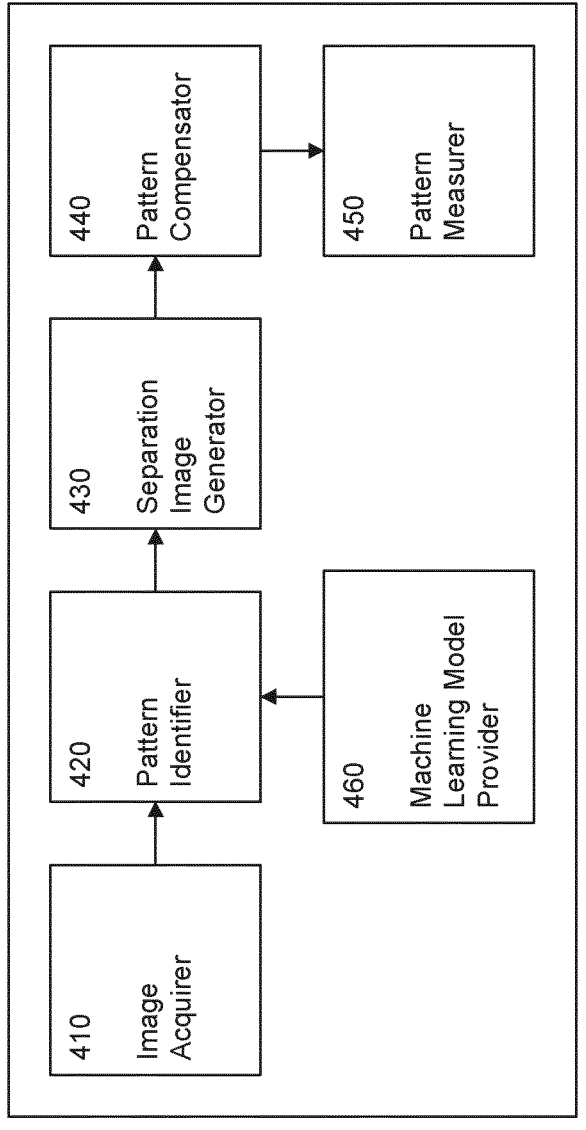
FIG. 4 is a block diagram of an example contour extraction apparatus, consistent with embodiments of the present disclosure.

FIG. 4 is a block diagram of an example contour extraction apparatus, consistent with embodiments of the present disclosure. It is appreciated that in various embodiments contour extraction apparatus 400 may be part of or may be separate from a charged-particle beam inspection system (e.g., electron beam inspection system 100 of FIG. 1). In some embodiments, contour extraction apparatus 400 may be part of controller 50 and may include an image acquirer, measurement circuitry, or storage, or the like. In some embodiments, contour extraction apparatus 400 may comprise an image processing system and may include an image acquirer, storage, or the like.

In some embodiments, as illustrated in FIG. 4, contour extraction apparatus 400 may include an inspection image acquirer 410, a pattern identifier 420, a separation image generator 430, a pattern compensator 440, and a pattern measurer 450.

According to embodiments of the present disclosure, inspection image acquirer 410 can acquire an inspection image of sample to be inspected. For illustration purposes and simplicity, inspection image 300 illustrated in FIG. 3 will be used as an example of an inspection image acquired by inspection image acquirer 410. In some embodiments, inspection image acquirer 410 may generate inspection image 300 based on a detection signal from electron detection device 140 of electron beam tool 40. In some embodiments, inspection image acquirer 410 may be part of or may be separate from an image acquirer included in controller 50. In some embodiments, inspection image acquirer 410 may obtain inspection image 300 generated by an image acquirer included in controller 50. In some embodiments, inspection image acquirer 410 may obtain inspection image 300 from a storage device or system storing the inspection image 300.

Figures 5A, 5B:
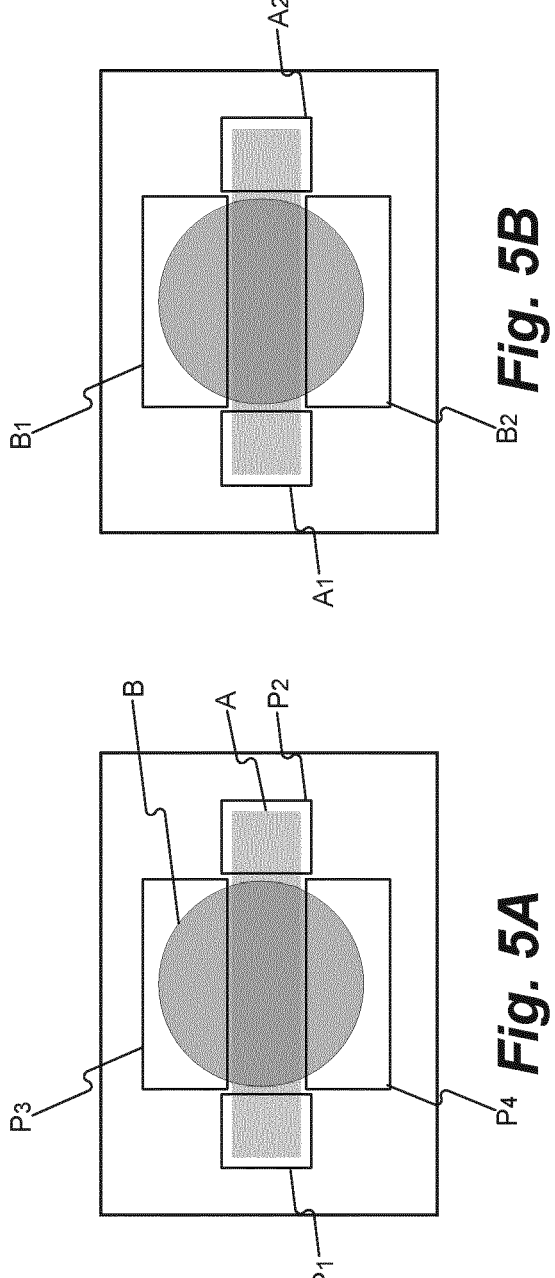
FIG. 5A is an example for extracting image patches from inspection image, consistent with embodiments of the present disclosure.
FIG. 5B is an example for labeling image patches of an inspection image, consistent with embodiments of the present disclosure.

Pattern identifier 420 is configured to identify patterns on inspection image 300, consistent with embodiments of the present disclosure. According to embodiments of the present disclosure, pattern identifier 420 can extract image patches, which are portions of an image, from inspection image 300 and can identify patterns, which are features on a die or in a layout database (e.g., GDS—Graphic Data System), corresponding to the extracted image patches. In some embodiments, each image patch can include at least a portion of one pattern which does not overlap with other patterns. FIG. 5A illustrates four image patches $P_1$ to $P_4$ extracted from inspection image 300 as an example. As shown in FIG. 5A, each of first image patch $P_1$ and second image patch $P_2$ covers a portion of first pattern A that does not overlap with second pattern B Similarly, each of third image patch $P_3$ and fourth image patch $P_4$ covers a portion of second pattern B that does not overlap with first pattern A. According to some embodiments of the present disclosure, image patches can be selected as large as possible to increase a pattern recognition ratio. For example, in FIG. 5A, for the area covered by first image patch $P_1$, only one image patch is extracted rather than two or more image patches for the same area. In some embodiments of the present disclosure, image patches can be selected such that each image patch includes a boundary line(s) of a corresponding pattern because boundary lines can be used to recognize patterns. In some embodiments, a boundary line of a pattern can be a line for determining an outer shape of the pattern, a line for determining an inner shape of the pattern, a border line between different textures in the pattern, or other types of lines that can be used for recognizing the pattern. For example, FIG. 5A illustrates that first and second image patches $P_1$ and $P_2$ include a partial line for determining an outer shape (e.g., a rectangle) of first pattern A and third and fourth image patches $P_3$ and $P_4$ include a partial line for determining an outer shape (e.g., a circle) of second pattern B.

Referring back to FIG. 4, pattern identifier 420 can be configured to associate each image patch with a corresponding pattern based on a machine learning model according to some embodiments of the present disclosure. For example, pattern identifier 420 can determine that each of first image patch $P_1$ and second image patch $P_2$ is part of first pattern A and each of third image patch $P_3$ and fourth image patch $P_4$ is part of second pattern B by using extracted image patches $P_1$ to $P_4$ as inputs to the machine learning model. In some embodiments, pattern identifier 420 can automatically label each image patch with corresponding pattern identity. For example, as shown in FIG. 5B, first image patch $P_1$ and second image patch $P_2$ are labeled as $A_1$ and $A_2$ to represent first pattern A and third image patch $P_3$ and fourth image patch $P_4$ are labeled as $B_1$ and $B_2$ to represent second pattern B.

According to embodiments of the present disclosure, pattern identifier 420 can acquire a machine learning model from a machine learning model provider 460. In some embodiments, a machine learning model can be trained to identify patterns of image patches by machine learning model provider 460. According to embodiments of the present disclosure, machine learning model provider 460 can pre-train the machine learning model and provide the trained machine learning model to pattern identifier 420 on demand. In some embodiments, a machine learning model obtained from machine learning model provider 460 can be stored in storage medium (not shown) and can be accessed by pattern identifier 420. In some embodiments, machine learning model provider 460 can update a machine learning model when new inspection images are acquired.

Figure 6:
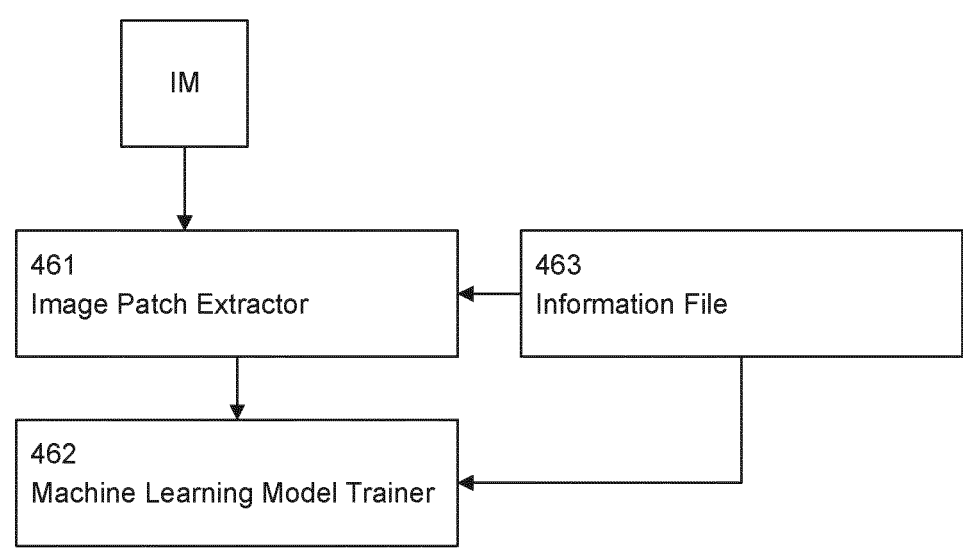
FIG. 6 is a block diagram of an example neural network model provider of the contour extraction apparatus of FIG. 4, consistent with embodiments of the present disclosure.

Reference is now made to FIG. 6, which illustrates a block diagram of an example neural network model provider, consistent with embodiments of the present disclosure. As illustrated in FIG. 6, machine learning model provider 460 may include an image patch extractor 461, a machine learning model trainer 462, and information file 463.

Image patch extractor 461 can receive a training inspection image IM acquired from an inspection system such as, but not limited to, a tool 40 or system 100. In some embodiments, training inspection image IM can include two or more patterns as shown in FIG. 3. When training inspection image IM includes multiple patterns, image patch extractor 461 can extract image patches as illustrated in FIG. 5A. For illustration purposes and for simplicity, a process of training a machine learning model will be explained by using inspection image 300 of FIG. 3 as training inspection image IM and by using image patches $P_1$ to $P_4$ of FIG. 5A as training image patches.

Machine learning model trainer 462 can be configured to train a machine learning model to be supplied to pattern identifier 420 by using image patches $P_1$ to $P_4$ extracted from training inspection image IM as inputs for the machine learning model, consistent with embodiments of the present disclosure. According to embodiments of the present disclosure, machine learning model trainer 462 can train a machine learning model to predict a pattern with which each image patch is associated by referring to reference images contained in information file 463.

According to embodiments of the present disclosure, information file 463 can contain reference images corresponding to patterns included in training inspection image IM. For example, information file 463 can include a first reference image corresponding to first pattern A and a second reference image corresponding to second pattern B. In some embodiments, a reference image contained in information file 463 can be a ground truth image of a corresponding pattern. A ground truth image can include a raw image of a wafer or die containing the corresponding pattern or can include a ground truth wafer map measured from a wafer or die containing the corresponding pattern, among others. In some embodiments, a reference image contained in information file 463 can be in Graphic Database System (GDS) format, Graphic Database System II (GDS II)

format, an Open Artwork System Interchange Standard (OASIS) format, a Caltech Intermediate Format (CIF), etc. In some embodiments, a reference image contained in information file 463 can comprise a wafer design layout of a corresponding pattern. The wafer design layout may be based on a pattern layout for constructing the wafer. The wafer design layout may correspond to one or more photolithography masks or reticles used to transfer features from the photolithography masks or reticles to a wafer. In some embodiments, a reference image in GDS or OASIS, among others, may comprise feature information stored in a binary file format representing planar geometric shapes, text, and other information related to wafer design layout.

In some embodiments, machine learning model trainer 462 can be configured to train a machine learning model through supervised learning. In supervised learning, the training data fed to a machine learning model includes the desired solutions. For example, a machine learning model can be trained with input training data such as image patches $P_1$ to $P_4$ under a condition that corresponding patterns to image patches $P_1$ to $P_4$ are known to machine learning model trainer 462. During training, weights for a machine learning model can be updated or revised so that a machine learning model can supply inference results corresponding to the known solutions. For training purposes, image patch extractor 461 can also refer to reference images contained information file 463 when extracting images patches from training inspection image IM. For example, image patch extractor 461 can extract image patches corresponding to a certain pattern by referring to a reference image of the certain pattern.

While a training process has been explained with respect to one training inspection image IM including two patterns, it will be appreciated that embodiments of the present disclosure can be applied to scenarios involving two or more training inspection images and each image can include one or more patterns. In these scenarios, a reference image for each pattern included in the two or more training inspection images can be included in information file 463. It is noted that a process of searching a corresponding pattern of a certain image patch is time and resource consuming when reference images and a number of patterns are large. Therefore, pre-training the machine learning model allows identifying patterns of inspection image in real time.

Referring back to FIG. 4, separation image generator 430 is configured to separate patterns of inspection image 300 and to generate a separation image per pattern of inspection image 300, consistent with embodiments of the present disclosure. According to some embodiments, separation image generator 430 can generate a separation image based on pattern identification from pattern identifier 420 and based on reference images corresponding to the patterns. Reference images used for separating patterns of an inspection image can be the reference images explained with respect to information file 463. In some embodiments, separation image generator 430 can have access to information file 463 included in machine learning model provider 460 or have a separate database (not shown) containing reference images.

Figures 7A, 7B, 7C:
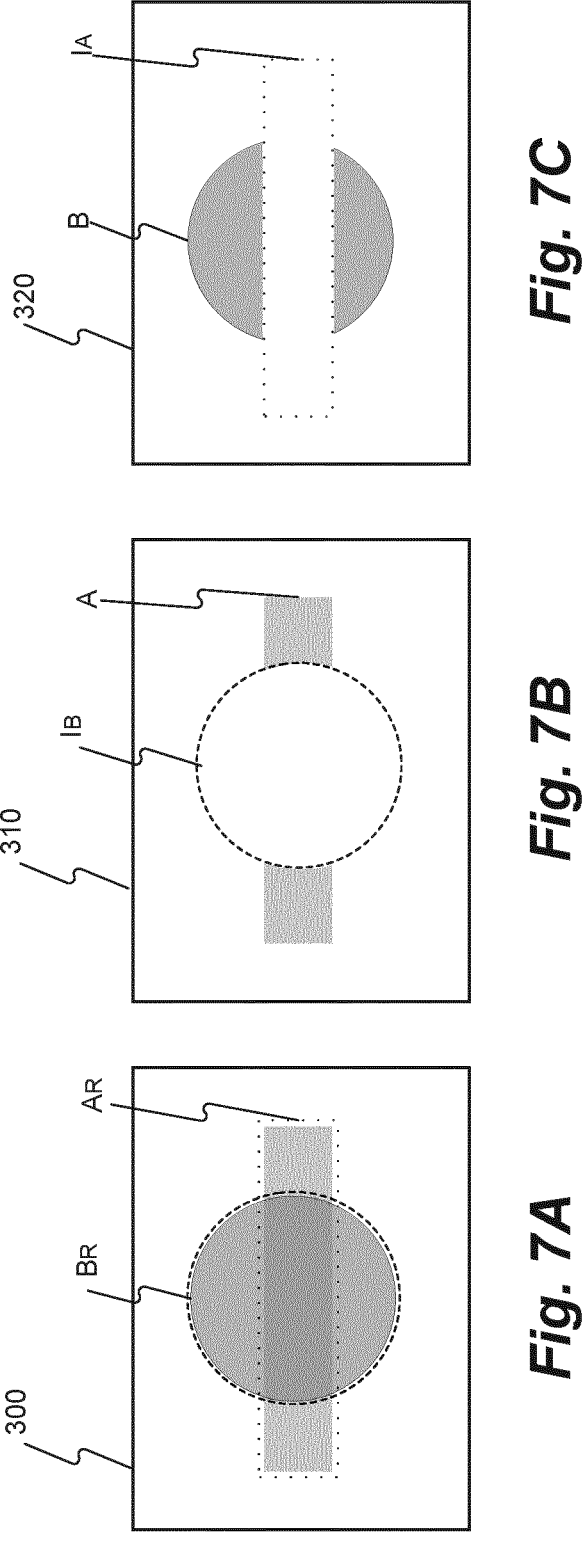
FIG. 7A is an example of an inspection image on which a reference image for each pattern is superimposed, consistent with embodiments of the present disclosure.
FIG. 7B is an example for a first separation image after removing second pattern from inspection image, consistent with embodiments of the present disclosure.
FIG. 7C is an example for a second separation image after removing first pattern from inspection image, consistent with embodiments of the present disclosure.

A process for separating patterns on inspection image 300 will be explained by referring to FIGS. 7A, 7B, and 7C. FIG. 7A is an example of inspection image on which a reference image for each pattern is superimposed, consistent with embodiments of the present disclosure. Based on the pattern identification by pattern identifier 420 as shown in FIG. 5B, reference images can be superimposed on corresponding pattern A and B. A reference image can be aligned to match a corresponding pattern as closely as possible when superimposing the reference image on inspection image 300. In some embodiments, a reference image can be aligned to match the corresponding pattern at an angular position, an outer boundary, etc. For example, a first reference image $A_R$ is superimposed on first pattern A, as shown in FIG. 7A Similarly, a second reference image $B_R$ is superimposed on second pattern B, FIG. 7A.

According to embodiments of the present disclosure, when superimposing a reference image on inspection image 300, separation image generator 430 can match the reference image with image patches that are determined to correspond to the reference image. For example, first reference image $A_R$ can be superimposed on inspection image 300 by comparing first and second image patches $P_1$ and $P_2$, which are determined to correspond to first pattern A, with first reference image $A_R$ in terms of a location, a shape, a texture, and so on. Similarly, second reference image $B_R$ can be superimposed on inspection image 300 by comparing third and fourth image patches $P_3$ and $P_4$, which are determined to correspond to second pattern B, with second reference image $B_R$ in terms of a location, a shape, a texture, and so on.

According to embodiments of the present disclosure, separation image generator 430 can generate a first separation image by removing an image area covered by second pattern B from inspection image 300. FIG. 7B illustrates an example for a first separation image 310. In FIG. 7B, the removed image area is indicated as $I_B$. In some embodiments, removing an image area covered by second pattern B can be performed according to second reference image $B_R$ that is superimposed on inspection image 300 as illustrated in FIG. 7A. In some embodiments, when removing an image area covered by second pattern B, the removed image area $I_B$ can be larger than second reference image $B_R$ to ensure that second pattern B is removed from first separation image 310. For example, an outer boundary of the removed image area $I_B$ can be positioned outside of second reference image $B_R$. As shown in FIG. 7B, it is noted that a part of first pattern A, which overlaps with second pattern B, is also removed from inspection image 300.

Similarly, separation image generator 430 can generate a second separation image by removing an image area covered by first pattern A from inspection image 300. FIG. 7C illustrates an example for a second separation image 320. In FIG. 7C, the removed image area is indicated as $I_A$. According to some embodiments of the present disclosure, removing an image area covered by first pattern A can be performed according to first reference image $A_R$ that is superimposed on inspection image 300 as illustrated in FIG. 7A. In some embodiments, when removing an image area covered by first pattern A, the removed image area $I_A$ can be larger than first reference image $A_R$ to ensure that first pattern A is removed from second separation image 320. For example, an outer boundary of the removed image area $I_A$ can be positioned outside of first reference image $A_R$. As shown in FIG. 7C, it is noted that a part of second pattern B, which overlaps with first pattern A, is also removed from inspection image 300.

While a process of pattern separation is illustrated by using inspection image including two patterns and thus two separation images are generated, it is noted that the present disclosure is also applicable when an inspection image includes three or more patterns. For example, three separation images can be generated when an inspection image includes three patterns, e.g., first pattern to third pattern. First separation image can be generated by removing image areas covered by second pattern and third pattern, second separation image can be generated by removing image areas covered by first pattern and third pattern, and third separation image can be generated by removing image areas covered by first pattern and second pattern.

As discussed above, a part of first pattern A is also removed in first separation image 310 when removing second pattern B from inspection image 300 as illustrated in FIG. 7B and a part of second pattern B is also removed in second separation image 320 when removing first pattern A from inspection image 300 as illustrated in FIG. 7C. Therefore, a separation image may include an incomplete pattern. Referring back to FIG. 4, pattern compensator 440 can be configured to update or restore an incomplete pattern in a separation image, consistent with embodiments of the present disclosure. According to some embodiments of the present disclosure, pattern compensator 440 can update or restore a pattern based on an inpainting algorithm. An inpainting algorithms can be used to reconstruct lost/missing or deteriorated parts of images. In some embodiments, pattern compensator 400 can utilize structural information, textual information, or contextual information of a separation image and reference image when restoring an incomplete pattern.

Figure 8B:
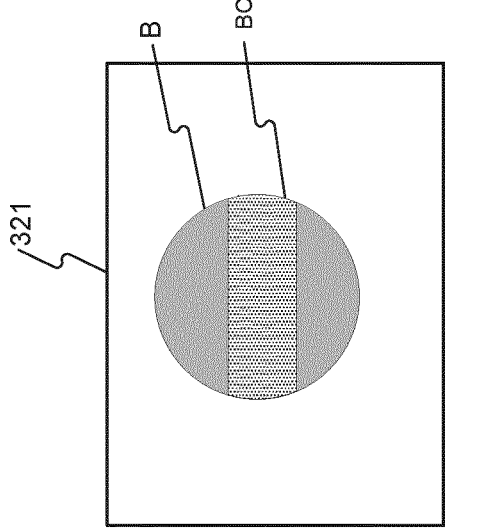
FIG. 8B is an example for a second restored image after restoring second pattern in second separation image, consistent with embodiments of the present disclosure.
Figure 8A:
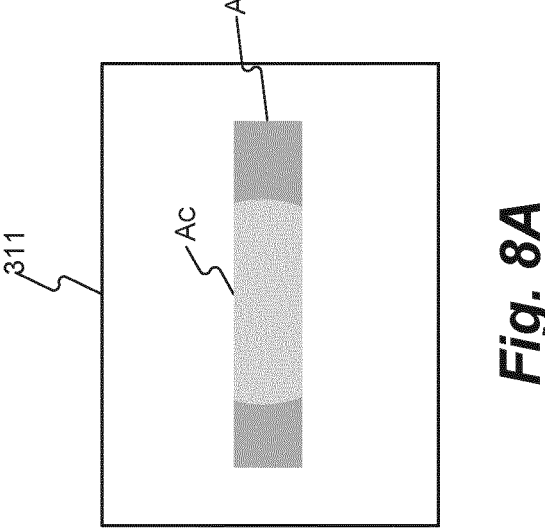
FIG. 8A is an example for a first restored image after restoring first pattern in first separation image, consistent with embodiments of the present disclosure.

FIG. 8A is an example for a first restored image after restoring first pattern A in first separation image, consistent with embodiments of the present disclosure. As shown in FIG. 8A, a first restored image 311 can be generated by restoring or filling a removed part of first pattern A in first separation image 310. The removed part of first pattern A can be a part of first pattern A, which is removed when generating first separation image 310 (e.g., shown in FIG. 7B) when removing second pattern B. According to some embodiments, pattern compensator 440 can restore or fill a removed part of first pattern A in first separation image 310 based on first reference image $A_R$ (shown in FIG. 7A). For example, pattern compensator 440 can determine which part in first reference image $A_R$ corresponds to the removed part of first pattern A in first separation image 310 by comparing unremoved part of first pattern A and first reference image $A_R$. For example, pattern compensator 440 can compare unremoved parts of first pattern A in first separation image 310 and first pattern A contained in first reference image $A_R$ in terms of a location, a shape, a texture, and so on. Based on the determination of the corresponding part in first reference image $A_R$ to the removed part of first pattern A in first separation image 310, first restoring part Ac can be filled in the removed part of first pattern A and therefore first restored image 311 including restored first pattern A can be generated as shown in FIG. 8A.

Similarly, FIG. 8B is an example for a second restored image after restoring a second pattern in a second separation image, consistent with embodiments of the present disclosure. As shown in FIG. 8B, a second restored image 321 can be generated by restoring or filling a removed part of second pattern B in second separation image 320. The removed part of second pattern B can be a part of second pattern B, which is removed when generating second separation image 320 (e.g., shown in FIG. 7C) when removing first pattern A Similarly, pattern compensator 440 can determine which part in second reference image $B_R$ corresponds to the removed part of second pattern B in second separation image 320 by comparing unremoved part of second pattern B and second reference image $B_R$. Based on the determination of the corresponding part in second reference image $B_R$ to the removed part of second pattern B in second separation image 320, second restoring part $B_C$ can be used to fill in the removed part of second pattern B and therefore second restored image 321, including restored second pattern B, can be generated as shown in FIG. 8B.

As shown in FIGS. 8A and 8B, first restored image 311 including a whole contour of first pattern A and second restored image 321 including a whole contour of second pattern B are generated by pattern compensator 440. Referring back to FIG. 4, pattern measurer 450 can be configured to take measurements of first pattern A and second pattern B from first restored image 311 and second restored image 321 respectively. For example, pattern measurer 450 can extract contour information of first pattern A from first restored image 311 and can extract contour information of second pattern B from second restored image 321.

According to some embodiments of the present disclosure, contour information of patterns can be used to take critical dimensions of the patterns to determine pattern shifts, edge placement variations, and so on. In some embodiments, an overlay error can be measured based on contour information of patterns. For example, in the above example, a center of mass of first pattern A and a center of mass of second pattern B can be determined from the extracted contour information of first pattern A and second pattern B. By comparing a distance between the two centers of mass of first pattern A and second pattern B with an intended distance, an overlay error between two patterns in the inspection image can be determined. In some embodiments, an intended distance between two patterns can be obtained, e.g., from a wafer design layout.

Figure 9:
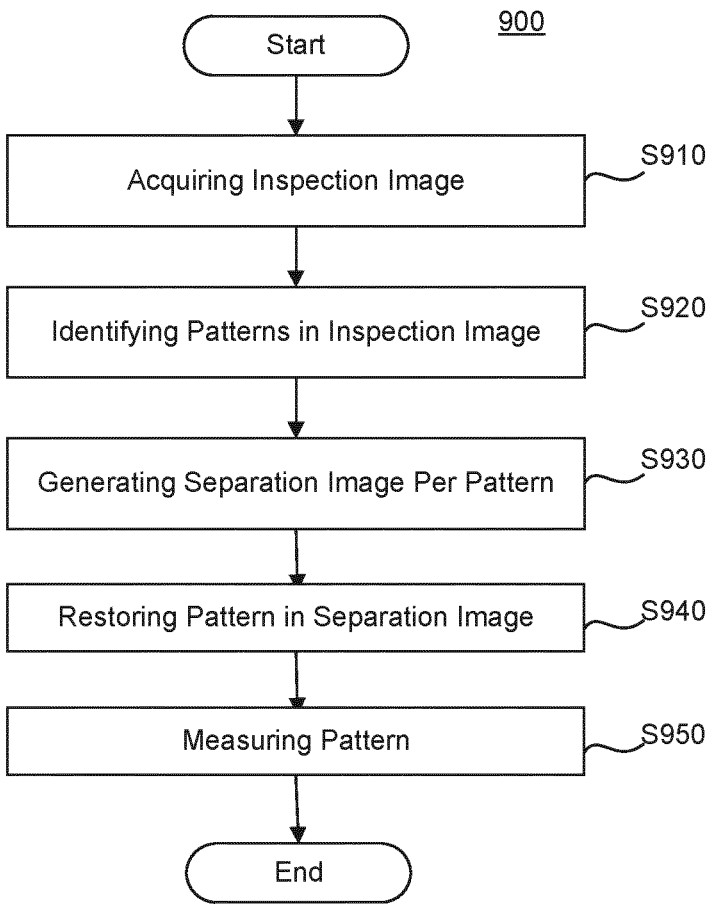
FIG. 9 is a process flowchart representing an example method for extracting contour information from an electron beam image, consistent with embodiments of the present disclosure.

FIG. 9 is a process flowchart representing an example method for extracting contour information from an inspection image, consistent with embodiments of the present disclosure. For illustrative purpose, a method for extracting contour information from an inspection image will be described referring to contour extraction apparatus 400 of FIG. 4.

In step S910, an inspection image of a sample can be obtained. Step S910 can be performed by, for example, inspection image acquirer 410, among others. For illustration purposes and simplicity, inspection image 300 illustrated in FIG. 3 will be used as an example inspection image. In some embodiments, inspection image 300 can be generated based on a detection signal from electron detection device 140 of electron beam tool 40. In some embodiments, inspection image 300 is generated by an image acquirer included in controller 50. In some embodiments, inspection image 300 can be obtained from storage that is storing inspection image 300.

In step S920, patterns on inspection image 300 are identified. Step S920 can be performed by, for example, pattern identifier 420, among others. According to embodiments of the present disclosure, image patches from inspection image 300 can be extracted and patterns corresponding to the extracted image patches can be identified. In some embodiments, each image patch can include at least a portion of one pattern, which does not overlap with other patterns. FIG. 5A illustrates four image patches $P_1$ to $P_4$ extracted from inspection image 300 as an example. As shown in FIG. 5A, each of first image patch $P_1$ and second image patch $P_2$ covers a portion of first pattern A that does not overlap with second pattern B Similarly, each of third image patch $P_3$ and fourth image patch $P_4$ covers a portion of second pattern B that does not overlap with first pattern A. According to some embodiments of the present disclosure, image patches can be selected as large as possible to increase a pattern recognition ratio. For example, in FIG. 5A, for the area covered by first image patch $P_1$, only one image patch is extracted rather than two or more image patches for the same area. In some embodiments of the present disclosure, image patches can be selected such that each image patch includes a boundary line(s) of a corresponding pattern because boundary lines can be used to recognize patterns. In some embodiments, a boundary line of a pattern can be a line for determining an outer shape of the pattern, a line for determining an inner shape of the pattern, a border line between different textures in the pattern, or other types of lines that can be used for recognizing the pattern. For example, FIG. 5A illustrates that first and second image patches $P_1$ and $P_2$ include a partial line for determining an outer shape (e.g., a rectangle) of first pattern A and third and fourth image patches $P_3$ and $P_4$ include a partial line for determining an outer shape (e.g., a circle) of second pattern B.

In step S920, each image patch can be associated with a corresponding pattern based on a machine learning model according to some embodiments of the present disclosure. For example, each of first image patch $P_1$ and second image patch $P_2$ can be determined to be part of first pattern A and each of third image patch $P_3$ and fourth image patch $P_4$ can be determined to be part of second pattern B by using extracted image patches $P_1$ to $P_4$ as inputs to the machine learning model. In some embodiments, each image patch can be automatically labeled with corresponding pattern identity. For example, as shown in FIG. 5B, first image patch $P_1$ and second image patch $P_2$ are labeled as $A_1$ and $A_2$ to represent first pattern A and third image patch $P_3$ and fourth image patch $P_4$ are labeled as $B_1$ and $B_2$ to represent second pattern B.

According to embodiments of the present disclosure, a pre-trained machine learning model can be provided. A machine learning model can be provided by, for example, machine learning model provider 460, among others. In some embodiments, a machine learning model can be trained to identify patterns of image patches. According to embodiments of the present disclosure, the machine learning model can be pre-trained and can be provided to identify patterns on demand. In some embodiments, a machine learning model can be stored at a storage medium (not shown) and can be accessed to identify patterns. In some embodiments, a machine learning model can be updated when new inspection images are acquired.

Figure 10:
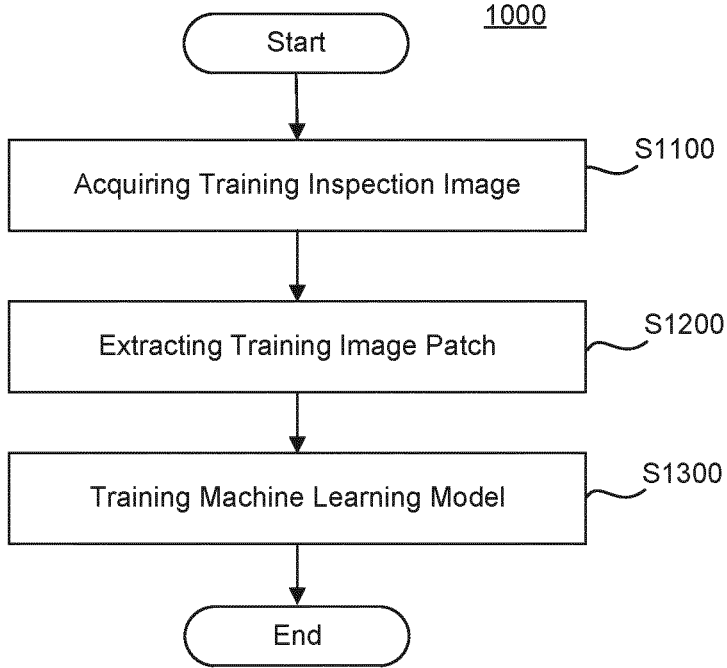
FIG. 10 is a process flowchart representing an example method for training a machine learning model, consistent with embodiments of the present disclosure.

Reference is now made to FIG. 10, which is a process flowchart representing an example method for training a machine learning model, consistent with embodiments of the present disclosure. For illustration purposes, a process of training a machine learning model will be explained with respect to FIG. 6.

In step S1100, a training inspection image is acquired from an inspection system such as, but not limited to, tool 40 or system 100. In some embodiments, training inspection image IM can include two or more patterns, as shown in FIG. 3. In some embodiments, training inspection image IM can include multiple patterns.

In step S1200, training image patches are extracted. Step S1200 can be performed by, for example, image patch extractor 461, among others. In some embodiments, training image patches can be extracted as image patches as illustrated in FIG. 5A. For illustration purposes and for simplicity, a process of training a machine learning model will be explained by using inspection image 300 of FIG. 3 as training inspection image IM and by using image patches $P_1$ to $P_4$ of FIG. 5A as training image patches.

In step S1300, a machine learning model is trained by using training image patches $P_1$ to $P_4$ extracted from training inspection image IM as inputs for the machine learning model, consistent with embodiments of the present disclosure. Step S1300 can be performed by, for example, machine learning model trainer 462, among others. According to embodiments of the present disclosure, a machine learning model can be trained to predict a pattern with which each image patch is associated by referring reference images contained in an information file (e.g., information file 463).

According to embodiments of the present disclosure, information file 463 can contain reference images corresponding to patterns included in training inspection image IM. For example, information file 463 can include a first reference image corresponding to first pattern A and a second reference image corresponding to second pattern B. In some embodiments, a reference image contained in information file 463 can be a ground truth image of a corresponding pattern. In some embodiments, a reference image contained in information file 463 can be in Graphic Database System (GDS) format, Graphic Database System II (GDS II) format, an Open Artwork System Interchange Standard (OASIS) format, a Caltech Intermediate Format (CIF), etc. In some embodiments, a reference image contained in information file 463 can comprise a wafer design layout of a corresponding pattern. The wafer design layout may be based on a pattern layout for constructing the wafer. The wafer design layout may correspond to one or more photolithography masks or reticles used to transfer features from the photolithography masks or reticles to a wafer. In some embodiments, a reference image in GDS or OASIS, among others, may comprise feature information stored in a binary file format representing planar geometric shapes, text, and other information related to wafer design layout.

In some embodiments, a machine learning model can be trained through supervised learning. In supervised learning, the training data fed to a machine learning model includes the desired solutions. For example, a machine learning model can be trained with input training data such as image patches $P_1$ to $P_4$ under a condition that corresponding patterns to image patches $P_1$ to $P_4$ are known. During training, weights for a machine learning model can be updated or revised so that a machine learning model can supply inference results corresponding to the known solutions. For training purposes, reference images contained information file 463 can be referred to when extracting images patches from training inspection image IM. For example, image patches corresponding to a certain pattern can be extracted by referring to a reference image of the certain pattern.

While a training process has been explained with respect to one training inspection image IM including two patterns, it will be appreciated that embodiments of the present disclosure can be applied to scenarios involving two or more training inspection images and each image can include one or more patterns. In these scenarios, a reference image for each pattern included in the two or more training inspection images can be included in information file 463. It is noted that a process of searching to locate a corresponding pattern of a certain image patch is time and resource consuming when reference images and a number of patterns are large. Therefore, pre-training the machine learning model allows identifying patterns of inspection image in real time.

Referring back to FIG. 9, in step S930, patterns of inspection image 300 can be separated and a separation image per pattern of inspection image 300 can be generated, consistent with embodiments of the present disclosure. Step S930 can be performed by, for example, separation image generator 430, among others. According to some embodiments, a separation image can be generated based on pattern identification in step S920 and based on reference images corresponding to the patterns. The reference images used for separating patterns on an inspection image can be the reference images explained with respect to information file 463.

FIG. 7A is an example of an inspection image on which a reference image for each pattern is superimposed, consistent with embodiments of the present disclosure. Based on the pattern identification as shown in FIG. 5B, reference images can be superimposed on corresponding pattern A and B. A reference image can be aligned to match a corresponding pattern as closely as possible when superimposing the reference image on inspection image 300. In some embodiments, a reference image can be aligned to match a corresponding pattern at an angular position, outer boundary, etc. For example, a first reference image $A_R$ is superimposed on first pattern A, as shown in FIG. 7A. Similarly, a second reference image $B_R$ is superimposed on second pattern B, FIG. 7A.

According to embodiments of the present disclosure, when superimposing a reference image on inspection image 300, the reference image can be matched with image patches, which are determined to correspond to the reference image. For example, first reference image $A_R$ can be superimposed on inspection image 300 by comparing first and second image patches $P_1$ and $P_2$, which are determined to correspond to first pattern A, with first reference image $A_R$ in terms of a location, a shape, a texture, and so on. Similarly, second reference image $B_R$ can be superimposed on inspection image 300 by comparing third and fourth image patches $P_3$ and $P_4$, which are determined to correspond to second pattern B, with second reference image $B_R$ in terms of a location, a shape, a texture, and so on.

According to embodiments of the present disclosure, a first separation image can be generated by removing an image area covered by second pattern B from inspection image 300. FIG. 7B illustrates an example for a first separation image 310. In FIG. 7B, the removed image area is indicated as $I_B$. In some embodiments, removing an image area covered by second pattern B can be performed according to second reference image $B_R$ that is superimposed on inspection image 300 as illustrated in FIG. 7A. In some embodiments, when removing an image area covered by second pattern B, the removed image area $I_B$ can be larger than second reference image $B_R$ to ensure that second pattern B is removed from first separation image 310. For example, an outer boundary of the removed image area $I_B$ can be positioned outside of second reference image $B_R$. As shown in FIG. 7B, it is noted that a part of first pattern A, which overlaps with second pattern B, is also removed from inspection image 300.

Similarly, a second separation image can be generated by removing an image area covered by first pattern A from inspection image 300. FIG. 7C illustrates an example for a second separation image 320. In FIG. 7C, the removed image area is indicated as $I_A$. According to some embodiments of the present disclosure, removing an image area covered by first pattern A can be performed according to first reference image $A_R$ that is superimposed on inspection image 300 as illustrated in FIG. 7A. In some embodiments, when removing an image area covered by first pattern A, the removed image area $I_A$ can be larger than first reference image $A_R$ to ensure that first pattern A is removed from second separation image 320. For example, an outer boundary of the removed image area $I_A$ can be positioned outside of first reference image $A_R$. As shown in FIG. 7C, it is noted that a part of second pattern B, which overlaps with first pattern A, is also removed from inspection image 300.

While a process of pattern separation is illustrated by using inspection image including two patterns and thus two separation images are generated, it is noted that the present disclosure is also applicable when an inspection image includes three or more patterns. For example, three separation images can be generated when an inspection image includes three patterns, e.g., first pattern to third pattern. First separation image can be generated by removing image areas covered by second pattern and third pattern, second separation image can be generated by removing image areas covered by first pattern and third pattern, and third separation image can be generated by removing image areas covered by first pattern and second pattern.

As discussed above, a part of first pattern A is also removed in first separation image 310 when removing second pattern B from inspection image 300 as illustrated in FIG. 7B and a part of second pattern B is also removed in second separation image 320 when removing first pattern A from inspection image 300 as illustrated in FIG. 7C. Therefore, a separation image may include an incomplete pattern. Referring back to FIG. 4, in step S940, an incomplete pattern in a separation image can be restored, consistent with embodiments of the present disclosure. Step S940 can be performed by, for example, pattern compensator 440, among others. According to some embodiments of the present disclosure, a pattern can be restored based on an inpainting algorithm. In some embodiments, structural information, textual information, or contextual information of a separation image and reference image can be utilized when restoring an incomplete pattern.

FIG. 8A is an example for a first restored image after restoring first pattern A in first separation image, consistent with embodiments of the present disclosure. As shown in FIG. 8A, a first restored image 311 can be generated by restoring or filling a removed part of first pattern A in first separation image 310. The removed part of first pattern A can be a part of first pattern A, which is removed when generating first separation image 310 (e.g., shown in FIG. 7B) when removing second pattern B. According to some embodiments, a removed part of first pattern A in first separation image 310 can be restored or filled based on first reference image $A_R$. For example, it can be determined which part in first reference image $A_R$ corresponds to the removed part of first pattern A in first separation image 310 by comparing unremoved part of first pattern A and first reference image $A_R$ (as shown in FIG. 7A). For example, unremoved parts of first pattern A in first separation image 310 and first pattern A contained in first reference image $A_R$ can be compared in terms of a location, a shape, a texture, and so on. Based on the determination of the corresponding part in first reference image $A_R$ to the removed part of first pattern A in first separation image 310, first restoring part Ac can be filled in the removed part of first pattern A and therefore first restored image 311 including restored first pattern A can be generated as shown in FIG. 8A.

Similarly, FIG. 8B is an example for a second restored image after restoring second pattern in second separation image, consistent with embodiments of the present disclosure. As shown in FIG. 8B, a second restored image 321 can be generated by restoring or filling a removed part of second pattern B in second separation image 320. The removed part of second pattern B can be a part of second pattern B, which is removed when generating second separation image 320 (e.g., shown in FIG. 7C) when removing first pattern A. Similarly, pattern compensator 440 can determine which part in second reference image $B_R$ corresponds to the removed part of second pattern B in second separation image 320 by comparing unremoved part of second pattern B and second reference image $B_R$. Based on the determination of the corresponding part in second reference image $B_R$ to the removed part of second pattern B in second separation image 320, second restoring part $B_C$ can be used to fill in the removed part of second pattern B and therefore second restored image 321 including restored second pattern B can be generated as shown in FIG. 8B. As shown in FIGS. 8A and 8B, first restored image 311 including a whole contour of first pattern A and second restored image 321 including a whole contour of second pattern B are generated.

Referring back to FIG. 9, in step S950, measurements of patterns can be taken from restored separation images compensated in step S940. Step S950 can be performed by, for example, pattern measurer 450, among others. In some embodiments, measurements of first pattern A and second pattern B can be taken from first restored image 311 and second restored image 321 respectively. For example, contour information of first pattern A can be extracted from first restored image 311 and contour information of second pattern B can be taken from second restored image 321. According to some embodiments of the present disclosure, contour information of patterns can be used to take critical dimensions of the patterns to determine pattern shifts, edge placement variations, and so on.

The embodiments may further be described using the following clauses:

1. A method for extracting pattern contour information from an inspection image, the method comprising:
   identifying, from an inspection image obtained from a charged-particle beam inspection system, a first pattern and a second pattern that partially overlap in the inspection image;
   generating a first separation image by removing an image area corresponding to the second pattern from the inspection image, wherein the first separation image includes the first pattern of which a first part is removed when removing the image area corresponding to the second pattern; and
   updating the first separation image to include image data representing the removed first part of the first pattern based on a first reference image corresponding to the first pattern.

2. The method of clause 1, further comprising:
   extracting contour information of the first pattern from the updated first separation image.

3. The method of clause 1 or 2, wherein updating the first separation image is performed by filling the first part in the first separation image using an inpainting algorithm.

4. The method of any one of clauses 1-3, wherein identifying the first pattern and the second pattern comprises:
   extracting, from the inspection image, a first image patch covering a portion of the first pattern, wherein the portion of the first pattern is nonoverlapping with the second pattern;
   extracting, from the inspection image, a second image patch covering a portion of the second pattern, wherein the portion of the second pattern is nonoverlapping with the first pattern; and
   associating the first image patch with the first reference image and the second image patch with a second reference image corresponding to the second pattern.

5. The method of clause 4, wherein associating the first image patch with the first reference image and the second image patch with the second reference image is performed by using the first image patch and the second image patch as inputs to a machine learning model.

6. The method of any one of clauses 1-5, wherein identifying the first pattern and the second pattern is performed in real time.

7. The method of any one of clauses 1-3, wherein generating the first separation image comprises:
   superimposing, on the inspection image, the first reference image on the first pattern and a second reference image on the second pattern, wherein the second reference image corresponds to the second pattern; and
   removing the image area corresponding to the second pattern based on the second reference image superimposed on the second pattern.

8. The method of any one of clauses 1-7, wherein the first reference image is in Graphic Database System (GDS) format, Graphic Database System II (GDS II) format, Open Artwork System Interchange Standard (OASIS) format, or Caltech Intermediate Format (CIF).

9. The method of any one of clauses 2-8, further comprising:
   extracting contour information of the second pattern; and
   determining an overlay error between the first pattern and the second pattern based on the extracted contour information of the first pattern and the second pattern.

10. The method of clause 9, wherein the overlay error is determined based on a center of mass of the first pattern and a center of mass of the second pattern, and
   wherein the centers of mass of the first pattern and the second pattern are determined based on the extracted contour information of the first pattern and the second pattern.

11. The method of any one of clause 1-10, wherein the first pattern is in a buried layer.

12. A contour extraction apparatus comprising:
   a memory storing a set of instructions; and
   at least one processor configured to execute the set of instructions to cause the apparatus to perform:
   identifying, from an inspection image obtained from a charged-particle beam inspection system, a first pattern and a second pattern that partially overlap in the inspection image;
   generating a first separation image by removing an image area corresponding to the second pattern from the inspection image, wherein the first separation image includes the first pattern of which a first part is removed when removing the image area corresponding to the second pattern; and
   updating the first separation image to include image data representing the removed first part of the first pattern based on a first reference image corresponding to the first pattern.

13. The apparatus of clause 12, the at least one processor is configured to execute the set of instructions to cause the apparatus to further perform:
   extracting contour information of the first pattern from the updated first separation image.

14. The apparatus of clause 12 or 13, wherein updating the first separation image is performed by filling the first part in the first separation image using an inpainting algorithm.

15. The apparatus of any one of clauses 12-14, wherein identifying the first pattern and the second pattern comprises:

extracting, from the inspection image, a first image patch covering a portion of the first pattern, wherein the portion of the first pattern is nonoverlapping with the second pattern;

extracting, from the inspection image, a second image patch covering a portion of the second pattern, wherein the portion of the second pattern is nonoverlapping with the first pattern; and associating the first image patch with the first reference image and the second image patch with a second reference image corresponding to the second pattern.

16. The apparatus of clause 15, wherein associating the first image patch with the first reference image and the second image patch with the second reference image is performed by using the first image patch and the second image patch as inputs to a machine learning model.

17. The apparatus of any one of clauses 12-16, wherein identifying the first pattern and the second pattern is performed in real time.

18. The apparatus of any one of clauses 12-14, wherein generating the first separation image comprises:

superimposing, on the inspection image, the first reference image on the first pattern and a second reference image on the second pattern, wherein the second reference image corresponds to the second pattern; and removing the image area corresponding to the second pattern based on the second reference image superimposed on the second pattern.

19. The apparatus of any one of clauses 12-18, wherein the first reference image is in Graphic Database System (GDS) format, Graphic Database System II (GDS II) format, Open Artwork System Interchange Standard (OASIS) format, or Caltech Intermediate Format (CIF).

20. A non-transitory computer readable medium that stores a set of instructions that is executable by at least one processor of a computing device to cause the computing device to perform a method for extracting pattern contour information from an inspection image, the method comprising:

identifying, from an inspection image obtained from a charged-particle beam inspection system, a first pattern and a second pattern that partially overlap in the inspection image;

generating a first separation image by removing an image area corresponding to the second pattern from the inspection image, wherein the first separation image includes the first pattern of which a first part is removed when removing the image area corresponding to the second pattern;

updating the first separation image to include image data representing the removed first part of the first pattern based on a first reference image corresponding to the first pattern.

21. The computer readable medium of clause 20, the set of instructions that is executable by at least one processor of the computing device to cause the computing device to further perform:

extracting contour information of the first pattern from the updated first separation image.

22. The computer readable medium of clause 20 or 21, wherein updating the first pattern in the first separation image is performed by filling the first part in the first separation image using an inpainting algorithm.

23. The computer readable medium of any one of clauses 20-22, wherein identifying the first pattern and the second pattern comprises:

extracting, from the inspection image, a first image patch covering a portion of the first pattern, wherein the portion of the first pattern is nonoverlapping with the second pattern;

extracting, from the inspection image, a second image patch covering a portion of the second pattern, wherein the portion of the second pattern is nonoverlapping with the first pattern; and associating the first image patch with the first reference image and the second image patch with a second reference image corresponding to the second pattern.

24. The computer readable medium of clause 23, wherein associating the first image patch with the first reference image and the second image patch with the second reference image is performed by using the first image patch and the second image patch as inputs to a machine learning model.

25. The computer readable medium of any one of clauses 20-24, wherein identifying the first pattern and the second pattern is performed in real time.

26. The computer readable medium of any one of clauses 20-22, wherein generating the first separation image comprises:

superimposing, on the inspection image, the first reference image on the first pattern and a second reference image on the second pattern, wherein the second reference image corresponds to the second pattern; and removing the image area corresponding to the second pattern based on the second reference image superimposed on the second pattern.

27. The computer readable medium of any one of clauses 20-26, wherein the first reference image is in Graphic Database System (GDS) format, Graphic Database System II (GDS II) format, Open Artwork System Interchange Standard (OASIS) format, or Caltech Intermediate Format (CIF).

28. A method for measuring an overlay error from an inspection image, the method comprising:

identifying, from an inspection image obtained from a charged-particle beam inspection system, a first pattern and a second pattern that partially overlap in the inspection image, the first pattern being in a buried layer;

generating a first separation image including the first pattern and a second separation image including the second pattern from the inspection image;

extracting contour information of the first pattern and the second pattern based on the first separation image and the second separation image; and determining an overlay error between the first pattern and the second pattern based on the extracted contour information of the first pattern and the second pattern.

29. The method of clause 28, wherein the overlay error is determined based on a center of mass of the first pattern and a center of mass of the second pattern, and wherein the centers of mass of the first pattern and the second pattern are determined based on the extracted contour information of the first pattern and the second pattern.

30. The method of clause 28 or 29, wherein generating the first separation image comprises:

generating the first separation image by removing an image area corresponding to the second pattern from the inspection image, wherein the first separation image includes the first pattern of which a first part is removed when removing the image area corresponding to the second pattern; and updating the first separation image to include image data representing the removed first part of the first pattern based on a first reference image corresponding to the first pattern.

31. The method of any one of clauses 28-30, wherein identifying the first pattern and the second pattern comprises:

extracting, from the inspection image, a first image patch covering a portion of the first pattern, wherein the portion of the first pattern is nonoverlapping with the second pattern;

extracting, from the inspection image, a second image patch covering a portion of the second pattern, wherein the portion of the second pattern is nonoverlapping with the first pattern; and associating the first image patch with the first reference image and the second image patch with a second reference image corresponding to the second pattern.

32. The method of clause 31, wherein associating the first image patch with the first reference image and the second image patch with the second reference image is performed by using the first image patch and the second image patch as inputs to a machine learning model.

33. A non-transitory computer readable medium that stores a set of instructions that is executable by at least one processor of a computing device to cause the computing device to perform a method for measuring an overlay error from an inspection image, the method comprising:

identifying, from an inspection image obtained from a charged-particle beam inspection system, a first pattern and a second pattern that partially overlap in the inspection image, the first pattern being in a buried layer;

generating a first separation image including the first pattern and a second separation image including the second pattern from the inspection image;

extracting contour information of the first pattern and the second pattern based on the first separation image and the second separation image; and determining an overlay error between the first pattern and the second pattern based on the extracted contour information of the first pattern and the second pattern.

34. The computer readable medium of clause 33, wherein the overlay error is determined based on a center of mass of the first pattern and a center of mass of the second pattern, and wherein the centers of mass of the first pattern and the second pattern are determined based on the extracted contour information of the first pattern and the second pattern.

35. The computer readable medium of clause 33 or 34, wherein generating the first separation image comprises:

generating the first separation image by removing an image area corresponding to the second pattern from the inspection image, wherein the first separation image includes the first pattern of which a first part is removed when removing the image area corresponding to the second pattern; and updating the first separation image to include image data representing the removed first part of the first pattern based on a first reference image corresponding to the first pattern.

36. The computer readable medium of any one of clauses 33-35, wherein identifying the first pattern and the second pattern comprises:

extracting, from the inspection image, a first image patch covering a portion of the first pattern, wherein the portion of the first pattern is nonoverlapping with the second pattern;

extracting, from the inspection image, a second image patch covering a portion of the second pattern, wherein the portion of the second pattern is nonoverlapping with the first pattern; and associating the first image patch with the first reference image and the second image patch with a second reference image corresponding to the second pattern.

37. The computer readable medium of clause 36, wherein associating the first image patch with the first reference image and the second image patch with the second reference image is performed by using the first image patch and the second image patch as inputs to a machine learning model.

A non-transitory computer readable medium may be provided that stores instructions for a processor of a controller (e.g., controller 50 of FIG. 1) to carry out, among other things, image inspection, image acquisition, stage positioning, beam focusing, electric field adjustment, beam bending, condenser lens adjusting, activating charged-particle source, beam deflecting, and methods 900 and 1000. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. A method for extracting pattern contour information from an inspection image, the method comprising:

identifying, from an inspection image obtained from a charged-particle beam inspection system, a first pattern and a second pattern that partially overlap in the inspection image, wherein the first pattern and the second pattern are structures on a sample;

generating a first separation image by:

superimposing, on the inspection image, a second reference image on the second pattern, wherein the second reference image corresponds to the second pattern; and removing an image area corresponding to the second pattern from the inspection image, wherein the first separation image includes the first pattern of which a first part is removed when removing the image area corresponding to the second pattern; and updating the first separation image to include image data representing the removed first part of the first pattern based on a first reference image corresponding to the first pattern.

2. A contour extraction apparatus comprising:

a memory storing a set of instructions; and at least one processor configured to execute the set of instructions to cause the apparatus to perform:

identifying, from an inspection image obtained from a charged-particle beam inspection system, a first pattern and a second pattern that partially overlap in the inspection image, wherein the first pattern and the second pattern are structures on a sample;

generating a first separation image by:

superimposing, on the inspection image, a second reference image on the second pattern, wherein the second reference image corresponds to the second pattern; and removing an image area corresponding to the second pattern from the inspection image, wherein the first separation image includes the first pattern of which a first part is removed when removing the image area corresponding to the second pattern; and updating the first separation image to include image data representing the removed first part of the first pattern based on a first reference image corresponding to the first pattern.

3. The apparatus of claim 2, the at least one processor is configured to execute the set of instructions to cause the apparatus to further perform:

extracting contour information of the first pattern from the updated first separation image.

4. The apparatus of claim 2, wherein updating the first separation image is performed by filling the first part in the first separation image using an inpainting algorithm.

5. The apparatus of claim 2, wherein identifying the first pattern and the second pattern comprises:

extracting, from the inspection image, a first image patch covering a portion of the first pattern, wherein the portion of the first pattern is nonoverlapping with the second pattern;

extracting, from the inspection image, a second image patch covering a portion of the second pattern, wherein the portion of the second pattern is nonoverlapping with the first pattern; and associating the first image patch with the first reference image and the second image patch with a second reference image corresponding to the second pattern.

6. The apparatus of claim 5, wherein associating the first image patch with the first reference image and the second image patch with the second reference image is performed by using the first image patch and the second image patch as inputs to a machine learning model.

7. The apparatus of claim 2, wherein identifying the first pattern and the second pattern is performed in real time.

8. The apparatus of claim 2, wherein generating the first separation image comprises:

superimposing, on the inspection image, the first reference image on the first pattern; and removing the image area corresponding to the second pattern based on the second reference image superimposed on the second pattern.

9. The apparatus of claim 2, wherein the first reference image is in Graphic Database System (GDS) format, Graphic Database System II (GDS II) format, Open Artwork System Interchange Standard (OASIS) format, or Caltech Intermediate Format (CIF).

10. A non-transitory computer readable medium that stores a set of instructions that is executable by at least one processor of a computing device to cause the computing device to perform a method for extracting pattern contour information from an inspection image, the method comprising:

identifying, from an inspection image obtained from a charged-particle beam inspection system, a first pattern and a second pattern that partially overlap in the inspection image, wherein the first pattern and the second pattern are structures on a sample;

generating a first separation image by:

superimposing, on the inspection image, a second reference image on the second pattern, wherein the second reference image corresponds to the second pattern; and removing an image area corresponding to the second pattern from the inspection image, wherein the first separation image includes the first pattern of which a first part is removed when removing the image area corresponding to the second pattern;

updating the first separation image to include image data representing the removed first part of the first pattern based on a first reference image corresponding to the first pattern.

11. The non-transitory computer readable medium of claim 10, the set of instructions that is executable by at least one processor of the computing device to cause the computing device to further perform:

extracting contour information of the first pattern from the updated first separation image.

12. The non-transitory computer readable medium of claim 10, wherein updating the first pattern in the first separation image is performed by filling the first part in the first separation image using an inpainting algorithm.

13. The non-transitory computer readable medium of claim 10, wherein identifying the first pattern and the second pattern comprises:

extracting, from the inspection image, a first image patch covering a portion of the first pattern, wherein the portion of the first pattern is nonoverlapping with the second pattern;

extracting, from the inspection image, a second image patch covering a portion of the second pattern, wherein the portion of the second pattern is nonoverlapping with the first pattern; and associating the first image patch with the first reference image and the second image patch with a second reference image corresponding to the second pattern.

14. The non-transitory computer readable medium of claim 13, wherein associating the first image patch with the first reference image and the second image patch with the second reference image is performed by using the first image patch and the second image patch as inputs to a machine learning model.

15. The non-transitory computer readable medium of claim 10, wherein identifying the first pattern and the second pattern is performed in real time.

\* \* \* \* \*